Figure 1:
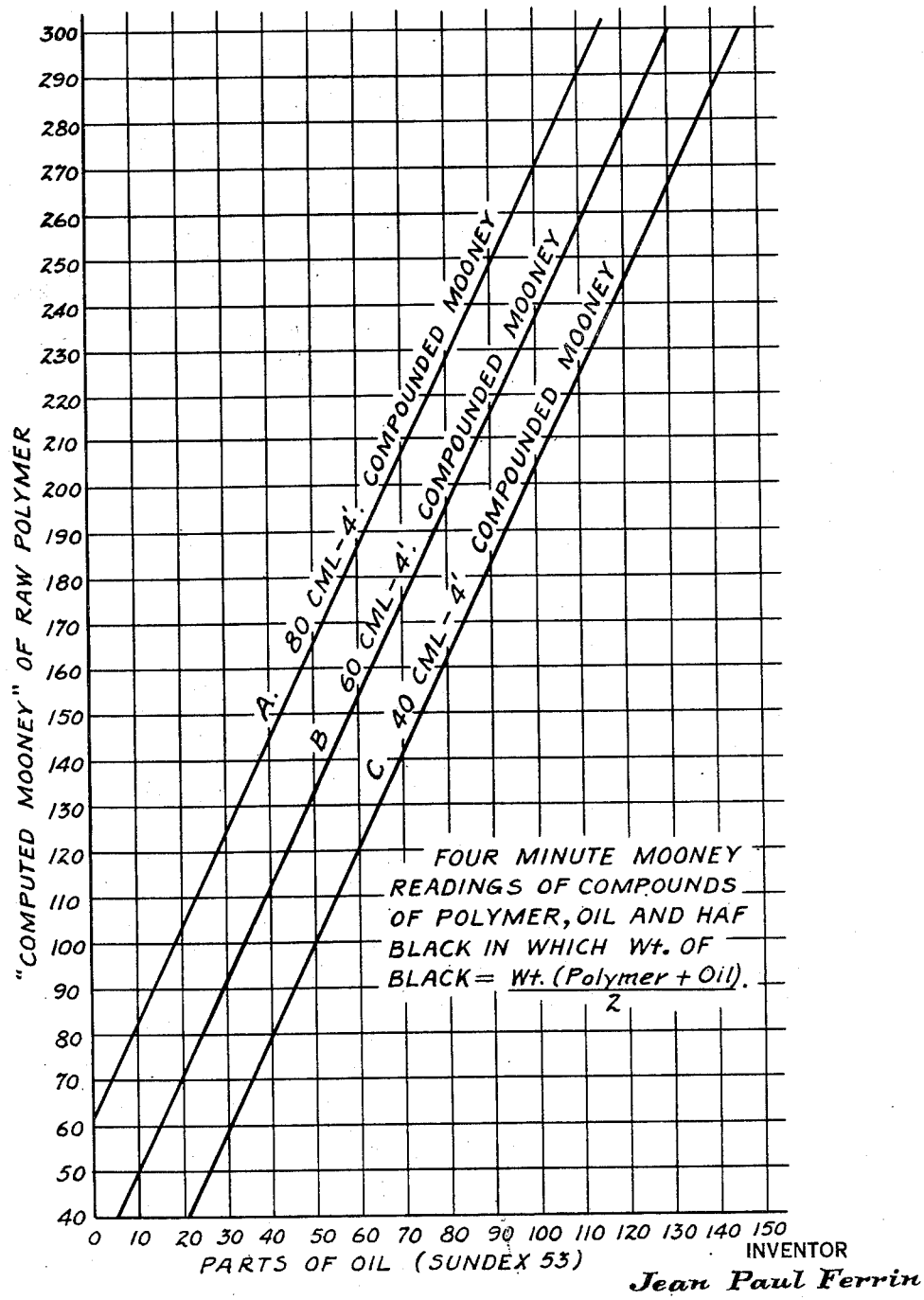

Jan. 8, 1957 J. P. FERRIN 2,776,693
ARCTIC RUBBER
Filed April 9, 1953

INVENTOR
Jean Paul Ferrin
BY Evans & McCoy
ATTORNEYS

United States Patent Office 2,776,693
Patented Jan. 8, 1957

2,776,693

ARCTIC RUBBER

Jean Paul Ferrin, Akron, Ohio, assignor to The General Tire and Rubber Company, Akron, Ohio, a corporation of Ohio Application April 9, 1953, Serial No. 347,817

10 Claims. (Cl. 152—330)

This invention relates to rubber compounds suitable for use at extremely low temperatures. It particularly relates to a tough or high-Mooney plasticized type of synthetic rubber compound having a plasticizer which provides flexibility, nerve, and elongation at extremely low temperatures.

There has been increasing need for a synthetic rubber which retains its rubbery characteristics at temperatures of 40° C. or 50° C. below zero and lower. Such temperatures are encountered in arctic regions and at high altitudes. Ordinary synthetitc rubbers, under such conditions, become stiff and sometimes even rigid so that they cannot be deflected or elongated. Certain rubbers have heretofore been made which retain flexibility at these low temperatures but they are either exceptionally expensive or have very poor physical characteristics and are not suitable for tires and cannot be used in the great majority of applications.

One object of the present invention is to provide a rubber compound which does not stiffen and become brittle in the coldest climates and at extremely low temperatures and which, at the same time, has good tensile strength, tear strength, and other desirable physical properties at ordinary temperatures.

Another object of the present invention is to provide a low temperature rubber which is inexpensive and is easily processed and manufactured.

It is still another object of the subject invention to provide rubber products which retain their characteristics at extremely low temperatures and which have satisfactory physical characteristics at ordinary temperatures.

It is a further object of the present invention to provide pneumatic tires which have properties equal or superior to those currently being manufactured and which retain their physical characteristics and flexibility at low temperatures.

Other objects and advantages will be apparent from the following description of this invention.

In accordance with this invention, I have found that when a polymer of a conjugated diolefinic compound having sufficiently high-Mooney viscosity is suitably mixed with certain long chain, polycarboxylic acid esters, a rubber is provided which has good physical characteristics and which remains pliable and flexible at extremely low temperatures.

The general process and technique of incorporating large amounts of plasticizers or extenders with high-Mooney rubber is set forth in copending application Serial No. 196,584 to Pfau et al. filed November 20, 1950, and assigned to the same assignee as the assignee of this invention. In this application, Pfau et al. disclose that the tough rubbers which were considered unprocessable and not suitable for making extruded tire treads in production may be mixed with relatively large amounts of one or more compatible oils or plasticizers to provide compounds of exceptional quality. Such compounds, containing large amounts of softener, have produced tire treads superior to those produced with the general purpose GR-S rubbers heretofore available and at very much reduced cost. The softener is incorporated in the rubber before the rubber is deteriorated by mastication and preferably while the rubber is in a finely divided state (such as is present in aqueous dispersions) or in a crumb-like state with small particles which may be separated by a pigment such as carbon black. Mastication in the presence of large amounts of softener added in the stages of the mastication procedure prevents the breakdown of the rubber such as is had by the usual masticating procedures.

The explanation appears relatively simple when it is postulated that all plastic flow is necessarily accomplished in high polymers by sliding of molecules over each other. As the molecules increase in size and become longer chains, the attractive force of interlocking of adjacent molecules or portions of molecules may be of greater strength than the primary valence bonds between atoms in the molecule, especially under the oxidizing conditions present. The result is that when mastication occurs some of these primary valence bonds are ruptured and the molecules become shortened. This takes place in ordinary rubber mastication and is evidenced by the increased plasticity and by the decreased physical properties of the final vulcanite as well as by a decrease in intrinsic viscosity.

It has been recognized that such degradation occurs, but as previously mentioned, it has been considered necessary for processability in the factory and this is a controlling factor. When a compatible oily plasticizer or a compatible plasticizer, which is liquid or viscous at the mixing temperature, is incorporated into the tough rubber, it apparently enters in between the molecules to lubricate them so that they slide more easily on each other and/or so that they are not subjected to sufficient strain to rupture the bonds. The oil prevents oxygen attack and the polymer is not broken down or deteriorated to any appreciable extent as in the case where the mastication is accomplished in the absence of sufficient plasticizer for such lubrication or protection. Appreciable degradation of molecules by mastication is apparently only had when the molecules are sufficiently large for their intermolecular forces to be greater than the bond strength between molecules under oxidative conditions. After a given rubber has been deteriorated or plasticized to such an extent that the molecules are relatively small, mastication may be continued with no physical rupture of the molecules. It is, therefore, seen that degradation by mastication alone is much more severe in the high-Mooney or very tough rubbers which have large molecules than in the case of the softer or lower Mooney rubbers.

As noted in the Pfau et al. application, it is very difficult to properly characterize the tougher polymeric materials. Polymers with Mooneys of around 120 and over cannot be properly measured on the Mooney Plastometer because there is slippage between the rotor and polymer. In addition, the gel content, gel distribution, and molecular weight directly affect the characteristics of the polymer but, for compounding purposes, they cannot be correlated with the reading of the Mooney Plastometer unless the history of the polymer is known.

In order to further characterize polymeric material and particularly tough polymeric material regardless of gel content, the term "computed Mooney" has been introduced. The computed Mooney of a polymer can be considered the measured Mooney of the polymer modified by compensating factors introduced to eliminate or minimize variations in Mooney readings caused by the gel in the polymer.

It is the final compound i. e. the rubber mixed with all pigments vulcanizing agents, carbon black and the like, that must be extruded or processed into the final article in the factory. It is thus necessary to provide compounds of the requisite Mooney viscosity i. e. "Compounded Mooney" or Mooney viscosity of the compound for factory processing regardless of the Mooney of the raw polymer. For practical purposes then, the compounded Mooney is the controlling measurement for actual working of the rubber no matter how tough or plastic the raw polymer is.

In any given polymer modified so as to have substantially no gel, the amount of oil or plasticizer required to obtain a given plasticity to the compound when mixed in a definite way varies directly with the measured Mooney plasticity up to the point where slippage occurs in the plastometer. There is a substantially straight line relationship between the amount of a given oily plasticizer required to obtain a given measured, compounded Mooney (Mooney viscosity in the compound) and the raw Mooney reading provided the polymer is gel free and a given amount of carbon black, such as a fine reinforcing furnace black, is incorporated with the polymer along with the oil. If, therefore, the polymers are of a non-gel type, and vary only by molecular weight, then the curves obtained by plotting parts of oil necessary to obtain a given compounded Mooney (CML-4') versus measured raw Mooney of the polymer are approximately parallel lines.

When gel is present the rubber may be homogeneous with one piece of the gel extending throughout the entire mass of the rubber or it may be heterogeneous with small particles of gel or tough rubber dispersed-like particles of sand in a very soft rubber. In the first case, the rubber will have a very high-Mooney viscosity reading and in the latter instance a very low viscosity reading. Further, the reading may vary because of the rigidity of the gel or gel particles themselves. Stiffer gel-like, higher measured Mooney, non-gel polymers require more plasticizer to form compounds of the desired Mooney viscosity.

It is, therefore, exceptionally difficult to characterize a given polymer or even attempt to correlate measured Mooney and gel content with amount of required plasticizer.

It has been found, however, that when both carbon black and plasticizer are added to a given rubber by following the same addition procedure, that the rubber can always be characterized. The black apparently stiffens up the non-gel particles so that they are stiffer than the gel particles. Upon mastication the disperse gel phase is then ground into the stiffer mixture forming a homogeneous compound. By noting the measured Mooney of the compound formed and the amount of oil or plasticizer used one is then able to determine the true measured Mooney (measured without slippage) of a gel free polymer that would take the same amount of oil and black to form a compound by the same compounded Mooney viscosity. The true measured Mooney of this gel free polymer is the "computed Mooney" of the rubber in question.

For further explanation of "computed Mooney" reference is made to Fig. 1 of the drawing. Here the computed Mooney is plotted along the vertical axis and the parts of plasticizer added to the rubber or polymer is plotted along the horizontal axis. Four minute Mooney readings of compounds consisting of polymer, plasticizer, and carbon black and having measured compounded Mooney viscosities of 80, 60, and 40 are shown by lines A, B, and C respectively. The plasticizer in this case is Sundex 53 but other plasticizers give similar lines. The polymers are all compounded alike so that the weight of the carbon black equals one half of the weight of the polymer plus the plasticizer. Larger or smaller ratios of carbon blacks could be utilized throughout although the above ratio is entirely satisfactory and corresponds to a good tire tread. The vertical coordinate gives the computed Mooney. This is the term utilized to characterize rubbery polymers for use in the subject invention.

For applicant's purposes, the computed Mooney is thus defined as the four minute Mooney viscosity measured on a large rotor of a gel-free polymer that takes the same amount of oil to produce a rubber-oil-carbon black compound of the same measured Mooney viscosity when the carbon black in the compound is one-half the weight of the rubber plus oil and the same mixing times are utilized.

The mixing procedure used for evaluating a polymer may, of course, affect the plasticity of the compounds obtained with a given amount of oil or plasticizer. Longer mixing times, particularly in the presence of insufficient plasticizer will considerably deteriorate the polymer and result in lower Mooney. Even in the presence of substantial amounts of plasticizer the substantially increased mixing times have slightly adverse effects on the polymer. If, therefore, in preparing a factory batch insufficient plasticizer or oil has been added to provide the processability necessary for the factory operations, increased processability may be had by remixing the material without any additional oil.

In preparing a mass of a given polymer or rubber for evaluation, the tough rubber is incorporated in a warm laboratory Banbury mixer (approximately 200° F.) worked for about one minute whereupon the tough rubber tends to break into fine crumbs which will not work into a cohesive mass in the Banbury. The oil or plasticizer is added in one or two increments depending on the amount of softener used and worked for four to six minutes. The oil should preferably be absorbed in the rubber before any carbon black is added, but the black can be added before the oil is completely absorbed if desired. When the tough polymer fails to break up into a fine crumb in the Banbury, a small amount of the black may be added initially to insure the formation of a fine crumb.

The carbon black is added in several increments and worked four or five minutes until a fairly cohesive mass is obtained. Cold water is preferably circulated through the Banbury during the carbon black addition in order to prevent excessive temperature rise. The total mixing time should be only that required to obtain a cohesive mass. The mix should immediately be placed in a cold tight laboratory mill (6" x 12" rolls) and milled for two minutes at .050 separation of rolls allowed to cool one-half hour and the compounded Mooney determined. When the rubber compound is to be used for the production of rubber articles the usual compounding ingredients may be added on a second pass through the Banbury mixer requiring about two to four minutes for the addition of the materials.

In accordance with my invention, I have found that when a tough, high computed Mooney rubber is plasticized with aliphatic alcohol esters of the saturated, long chain polybasic acids, obtained as residual by-products of the caustic hydrolysis of castor oil, the resultant rubber compound has good physical characteristics and maintains its flexibility, nerve, and rubbery characteristics at extremely low temperatures.

The hydrolysis of castor oil to obtain sebacic acid is described in U. S. Patent Nos. 2,182,056 and 2,267,268. In accordance with these patents, castor oil is subjected to hydrolysis in the presence of a caustic such as sodium hydroxide. The products from this reaction are distilled off between 100 and 270° C. at 4–20 mm. pressure to give two acid fractions. The residue left from the distillation is known as VR–1 acid.

VR–1 acids have an acid number between 140 and 165, and iodine number between 45 and 60, and are essentially non-volatile at 270° C. and 4 mm. pressure. Although primarily comprising long chain polycarboxylic acids, they also contain various ester and acid impurities together with other impurities which cannot be classified. They have an average molecular weight of 1000 and contain slightly less than two carboxylic acid groups per molecule. They form a rather viscous liquid with a dark amber color.

When a mixture of VR–1 acid and an excess of an aliphatic, monohydric alcohol is heated to boiling, an esterification reaction takes place and the distillate is an alcohol-water azeotrope. By removing the water, the reaction can be forced to completion to provide a good yield of VR–1 acid esters.

Suitable aliphatic monohydric alcohols are those containing at least two carbon atoms such as ethyl, 2 ethyl butyl, 2 ethyl hexyl, and methallyl alcohols. The alcohol can be saturated or unsaturated aliphatic alcohol, but if unsaturated the double bond should preferably be no closer to the OH group than the beta position. Various other substitutents may be on the aliphatic chain provided they do not react or cross-link with the rubber and are compatible with it. Alcohols containing an aromatic group such as a phenyl group are also satisfactory provided the aromatic group is removed from the OH group by an aliphatic group of at least three carbon atoms and does not prevent or interfere with the esterification reaction.

The VR–1 esters are preferably the sole or major plasticizer present if a rubber of real low temperature flexibility is desired. In such a case from 35 to 120 or more parts of VR–1 esters are mixed with 100 parts of a high-Mooney rubber together with from 30 to 100 parts of carbon black and other compounding ingredients. The rubber should have a "computed Mooney" of at least 80 and preferably of 90 or more and rubbers with computed Mooneys of over 120 are even more satisfactory as they tolerate more of the VR–1 esters. As explained in the co-pending application of Pfau et al., the carbon black is preferably added on the basis of total amount rubber plus ester or plasticizer instead of the amount of rubber alone. From 30 to 60 or in some cases even up to 100 parts of carbon black are added for each 100 parts of rubber plus plasticizer. High abrasion furnace black, fine furnace black or other reinforcing carbon blacks may be used as is well known in the art.

The VR–1 esters can be diluted or mixed with other extenders or plasticizers as listed in the aforementioned of the Pfau et al. application such as aromatic oils, napthenic oils, aromatic-napthenic oil blends, asphaltic plasticizers and fractions rosin and rosin oils, and similar commercitlly available compounds. Cardolite, and higher alcohol adipic acid esters such as dioctyl adipate mentioned in the above application as plasticizers also provide compounds with good low temperature properties.

VR–1 esters are the only inexpensive materials that I have found to provide when suitably mixed therein rubber compounds equivalent to Cardolite rubber compounds at low arctic temperatures. In order to have satisfactory arctic properties, however, at least 20 parts and preferably 35 parts of a VR–1 ester or VR–1 ester mixed with Cardolite and/or dioctyl adipate should be in the compound. Since some VR–1 esters are more effective than others and since the physical and low temperature requirements of the rubber compounds are different, the minimum percentage of VR–1 esters will be found somewhere within the aforementioned limits when the esters constitute the sole plasticizer. Even when other oily materials such as petroleum oils are also present, the effect of VR–1 esters even in small proportion becomes noticeable in reducing Gehman freeze point.

The following examples illustrate my invention:

EXAMPLE 1

A copolymer containing 72 parts of butadiene and 28 parts of styrene was made by reaction in an autoclave at 41° F. to 60 percent conversion. This polymer had a computed Mooney of approximately 211.

One hundred parts of this polymer were by identical procedures mixed with 100 parts of fine furnace carbon black and 100 parts of Circosol 2xH. Circosol 2xH is a light green viscous hydrocarbon liquid having a specific gravity of .94, Saybolt viscosity at 100° F. of about 200 seconds and at 210° F. of about 85 seconds. It is a predominately napthenic hydrocarbon containing some aromatic oil and when mixed with high-Mooney polymer gives a compound with much better low temperature properties than does most suitable hydrocarbon oils. It is supplied by the Sun Oil Company of Philadelphia, Pennsylvania.

Another 100 parts of this polymer were mixed with 100 parts of fine furnace carbon black and 100 parts of 2-ethylhexyl ester of VR–1 acid.

Still another 100 parts of this polymer were mixed with 100 parts of fine furnace carbon black and 100 parts of Cardolite 625. Cardolite 625 is an ethyl ether of Cardanol which is stated to be a monophenolic component of commercial cashew nut shell oil. It is supplied by the Irvington Paint and Varnish Company of Irvington, New Jersey. Cardolite 625 also provides better low temperature properties than other known plasticizers.

A usual amount about 1 part of sulfur, 5 parts of zinc oxide, 1 part of accelerator and 1 part of phenyl beta naphthylamine (antioxidant) was incorporated into each of the mixes.

These compounds were cured into suitable test sheets which were cut into 4" dumbbell shaped samples. The sheets were cured at from 30 to 90 minutes at 287° F. The physical characteristics were tested at room temperature (approximately 72° F.) and then the samples were subjected to various below zero temperatures and stretched 100 percent of their length. The percent retraction of the strip was measured as noted below.

slabs. The slabs having optimum cure were tested as to their low temperature properties in accordance with the

TABLE I

| Oil | 2-ethylhexyl ester 1EP124 | | | | Cardolite 625 | | | | Circosol 2xH | | | |
|---|---|---|---|---|---|---|---|---|---|---|---|---|
| Sample Number | | | | | | | | | | | | |
| Cure @ 287° F | 30 | 45 | 60 | 90 | 30 | 45 | 60 | 90 | 15 | 30 | 45 | 60 |

| ORIGINAL TESTED @ ROOM TEMPERATURE (72° F.) | | | | | | | | | | | | |
|---|---|---|---|---|---|---|---|---|---|---|---|---|
| Modulus | 1,240 | 1,420 | 1,530 | 1,640 | 1,010 | 1,060 | 1,020 | 1,330 | 378 | 1,170 | 1,430 | 1,360 |
| Tensile | 2,920 | 2,800 | 2,820 | 2,720 | 2,480 | 2,660 | 2,560 | 2,500 | 1,510 | 3,120 | 3,080 | 3,080 |
| Elongation | 560 | 505 | 480 | 455 | 565 | 550 | 550 | 450 | 865 | 610 | 525 | 535 |
| Durometer | 50 | 50 | 51 | 51 | 50 | 51 | 52 | 55 | 46 | 55 | 55 | 56 |
| Tear | 240 | 212 | 200 | 216 | 281 | 310 | 314 | 252 | 316 | 400 | 294 | 280 |

| ORIGINAL TESTED @ 205° F. | | | | | | | | | | | | |
|---|---|---|---|---|---|---|---|---|---|---|---|---|
| Modulus | 830 | 970 | 1,020 | 1,165 | 805 | 830 | 885 | 1,170 | | 1,050 | 1,310 | 1,330 |
| Tensile | 1,650 | 1,660 | 1,590 | 1,600 | 1,430 | 1,450 | 1,400 | 1,280 | | 1,590 | 1,610 | 1,550 |
| Elongation | 445 | 400 | 380 | 360 | 455 | 420 | 405 | 310 | | 420 | 370 | 330 |

| Hysteresis (° F.) | 78 | 68 | 66 |
|---|---|---|---|

| GOODRICH FLEXOMETER | | | |
|---|---|---|---|
| Permanent Set | 1.1 | 3.2 | 3.2 |

| DEMATTIA FLEXOMETER (½ in. cut growth per thousand flexes) | | | |
|---|---|---|---|
| | 35 | 25 | 35 |

| REBOUND | | | |
|---|---|---|---|
| Goodyear-Healy | 60.5 | 63.1 | 60.5 |
| Bashore | 38 | 49 | 42 |

| TEMPERATURE RETRACTION DATA (−° C.) | | | |
|---|---|---|---|
| Percent Retraction: | | | |
| 0 | -- | -- | -- |
| 1 | 69 | -- | -- |
| 2 | 60 | 67 | 67 |
| 3 | 59 | 66 | 51 |
| 5 | 57 | 65 | 49 |
| 10 | 55 | 62.5 | 41 |
| 20 | 53 | 59 | 40 |
| 30 | 50 | 56 | 38 |
| 40 | 49 | 53 | 37 |
| 50 | 45 | 49 | 36 |
| 60 | 40 | 44 | 33 |
| 70 | 39 | 38 | 30 |
| 80 | 35 | 34 | 24 |
| 90 | 28 | 27 | 17 |

From these tests it is evident that the VR-1 ester-rubber is considerably superior at low temperatures to the Circosol 2xH rubber and substantially equivalent to Cardolite.

EXAMPLE 2

This example further illustrates the superiority of VR-1 esters to other oily plasticizers and extenders. Rubber compounds were prepared with the plasticizers set forth in the following Table II.

The following formula in which parts are by weight was used in evaluating the polymer:

Formula:

|  | Parts |
|---|---|
| Rubber | 100 |
| Philblack O | 75 |
| Stearic acid | 2 |
| Zinc oxide | 5 |
| Sulfur | 2 |
| Santocure | 1 |

Softener or oil indicated in Table II.

The compounds were masticated or mixed in accordance with the aforementioned recommended procedure for evaluating polymers and cured into standard test slabs. The slabs having optimum cure were tested as to their low temperature properties in accordance with the procedure recommended by the article by S. D. Gehman, et al., Ind. & Eng. Chem. 39, 1108–1115 (1947) for Gehman values. The larger the Gehman value, at the temperature indicated, the better is the low temperature property of the compound. For purposes of comparison, there is also shown in the following table a GR-S compound containing 5 parts of Paraflux softener, which is generally recognized as a standard tread compound.

TABLE II

[(1) Gehman data relating angular twist to temperature]

| Pts. Oil Used | 75° F. | 65° F. | 45° F. | 45° F. | 35° F. | 25° F. |
|---|---|---|---|---|---|---|
| 60 Sundex 53 | | | | 1 | 2 | 78 | 150 |
| 60 Circosol 2xH | | | | 10 | 28 | 109 | 160 |
| 60 Sovaloid C | | | | 2 | 89 | 142 | |
| 60 Cardolite 625 | 5 | 23 | 65 | 154 | | |
| 60 Dioctyl Phthlate | | 5 | 33 | 90 | 145 | |
| 80 Diamond Process Oil | 1 | 14 | 100 | 144 | 154 | 157 |
| 50 Circle Light Oil | | | 3 | 68 | 116 | 133 |
| 40 Circle Light Oil | | 2 | 3 | 36 | 135 | 148 |
| GR-S (5 pts. Paraflux) | | | 2 | 20 | 97 | 125 |

The oils noted above are described as follows:

Sundex 53 (manufactured by the Sun Oil Co.) is a dark aromatic and naphthenic blend lubricating oil extract and consisting of 76% aromatic hydrocarbons and 26% naphthenic hydrocarbons. It has Saybolt viscosity at 210° F. of 90 seconds, a specific gravity of .97. Some of the hydrocarbons have aliphatic unsaturation.

Circosol 2xH (manufactured by the Sun Oil Co.) is a light green viscous hydrocarbon liquid having the specific gravity of .94, Saybolt viscosity at 100° F. of about 200 seconds and at 210° F. of about 85 seconds. It is a naphthenic type hydrocarbon containing some aromatic oil. It is predominantly naphthenic.

Sovaloid C (manufactured by the Socony Vacuum) is synthetically produced entirely aromatic hydrocarbon petroleum oil having a specific gravity of 1.06, a Saybolt universal viscosity at 110° of 36.

Cardolite 625 (manufactured by the Irvington Paint & Varnish Co.) is Cardanol stated to be the monophenolic component of commercial cashew nut shell oil. Cardolite 625 is ethyl ether of Cardanol. Some unsaturation in side chain.

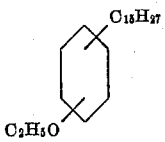

Diamond Process Oil (manufactured by the Standard Oil Company) is a low pour point oil largely paraffinic. It is a petroleum distillate obtained after the cracking process has a specific gravity of .883, a flash point of 360, a viscosity at 100° F. of 100, and at 210° F. of 39, an aniline point of 1.79, and a pour point of 15 to 20° F.

Circle Light Oil (manufactured by the Sun Oil Co.) is more volatile than Circosol 2xH and more aromatic hydrocarbons. It is a petroleum distillate obtained after the cracking process.

Paraflux is a saturated polymerized hydrocarbon supplied by the C. P. Hall Company of Akron, Ohio. This oil fluids at higher temperatures, has a specific gravity about 1.03, Saybolt viscosity at 100° C. of 77 seconds.

From Example 2 it is evident that Cardolite 625 and Diamond Process Oil are perhaps the most satisfactory of the plasticizers tested. Circosol 2xH and dioctyl phthlate also form satisfactory arctic rubbers and are much superior to the other plasticizers. Diamond Process Oil and dioctyl phthlate, however, give rubbers with very poor physical properties at ordinary temperatures and for this reason are not satisfactory.

Referring back to Table I of Example 1, the 2-ethylhexyl ester of VR-1 acid is seen to be equal to Cardolite and superior to Circosol 2xH in forming arctic rubbers. Thus it clearly follows that the esters of VR-1 acid form excellent arctic rubbers and are superior to the many other possible plasticizers and extenders.

In place of the 2-ethylhexyl ester of VR-1 acid, other straight or branched alcohol esters such as the 2-ethylbutyl ester, methallyl, ethyl, and hexyl octyl can be used with similar beneficial results. The longer chain esters give a more viscous plasticizer, particularly when the alcohol is a straight chain alcohol, and thus an ester of an alcohol of more than 10 or 12 aliphatic carbon atoms is not particularly desirable except as to lack of volatility. The shorter chain alcohol esters are more volatile hence a compromise of 3 to 8 carbon atoms is usually preferred. Branched chains are also more desirable because they are less volatile. Even the long chain, heavy oxofraction alcohols such as those supplied by the Enjay Company, Inc. of New York City can be used in accordance with this invention. The oxofraction alcohols are not as effective as the lighter and shorter chain alcohols, but they are also relatively inexpensive and for this reason are used.

The synthetic rubbers to which the present invention relates are polymers of conjugated diolefinic compounds such as butadiene, isoprene, chloroprene, cyanoprene, dimethylbutadiene and the like having not in excess of and preferably less than eight carbon atoms. Suitable synthetic rubbers are copolymers of one or more of these diolefinic compounds with one or more copolymerizable mono-olefine including arylolefinic and arylvinyl compounds such as alpha-methylstyrene, p-actyl-alpha-methylstyrene, styrene and halogenated and nuclearly methylated styrenes such as 2,5 or 3,4-dichlorostyrene, 3,4-dimethylstyrene, 3-chloro 4-methylstyrene; unsaturated polymerizable ketones such as methylisopropenylketone and methylvinylketone; the esters, amids and nitriles of acrylic and methacrylic acids including acrylonitrile, methacrylonitrile, methylmethacrylate, methylacrylate; and unsaturated cumates.

In the copolymers, the total proportion of butadiene and/or other conjugated diolefinic compounds is ordinarily at least 50 percent of the weight of the copolymer. However, I have been able to prepare a very desirable rubbery material by adding oil thereto with as much as 85 percent of mono-olefinic compounds such as styrene and 15 percent of butadiene or total conjugated diolefinic compound. Such materials are not desirable for tire treads but are suitable for other molded and extruded rubber articles.

The present invention is as aforementioned especially suitable for the production of rubber compounds that exhibit high flexibility at low temperatures such as may be encountered in far northern climates. While any of the polymers may be used in making such rubber compounds, the hydrocarbon rubber compounds prepared substantially entirely from a diolefin are preferred particularly when the polymerization takes place at a temperature well below 500° F. and preferably not in excess of 60° F.

Thus the synthetic rubbers consisting essentially of polymerized butadiene and/or polymerized isoprene are the preferred polymers for preparing general purpose compounds suitable for arctic purposes and may be used with any VR-1 ester plasticizers compatible therewith.

It should be noted that for any given "computed Mooney" reading or for any given actual measured Mooney in a given type of polymer there is a minimum amount of oil or VR-1 ester plasticizer which is required for satisfactory processing, that is, without long and uneconomical mastication cycles and mixes. When the rubber into which the oil or other plasticizer is incorporated has a computed Mooney of 90, about 30 parts of ester or other liquid softener is usually required for each 100 parts of rubber to obtain a 60 Mooney compound (60 CML-4') and 20 parts of ester are required to obtain a 70 CML-4' which is on the less plastic side of the more desirable factory processibility range. Where the benefits of the present invention become more impressive i. e. at "computed Mooneys" above 115, at least 30 parts of ester are usually required to obtain a factory processible 70 Mooney compound and about 40 parts are required for a 60 Mooney compound using the 50 parts of black per 100 parts of rubber. When the "computed Mooney" plasticity or (if the compound is gel free and prepared at low temperature) when the computed or measured Mooney is about 120, at least 35 parts and preferably about 40 parts is desirable in order to provide the desired factory processibility. When the "computed Mooney" plasticity of the rubber is 150 or above, at least 45 to 50 parts of the plasticizer are required to obtain the same processibility, and as much as 75 parts by weight of ester may be present per 100 parts by weight of a synthetic rubber without giving inferior properties to the standard GR-S polymer as presently manufactured. Even more ester plasticizer, say 100 parts, may be used when the black or pigment content is increased above the 50 percent of plasticizer plus black ratio. As much as 200 or even 250 parts of ester or other plasticizer may be used in some compounds with 100 parts of the toughest rubbers to obtain products of surprising value combined with low cost.

It is understood that, in accordance with the provisions of the patent statutes, variations and modifications of the subject invention may be made without departing from the spirit thereof.

What I claim is:

1. A vulcanizable rubber compound comprising a mixture of a rubber polymerization product of a diolefin which has a computed Mooney of at least 80 and at least 20 parts of an ester of an aliphatic alcohol having more than two carbon atoms and an acid residue as left from the distillation at about 100 to 270° C. at about 4 to 20 millimeters of mercury pressure of residual products from steam distillation of primary products of caustic hydrolysis of castor oil, said compound being in a substantially non-broken down state and having a plasticity less than 80 Mooney when measured with a large rotor at 4 minutes at standard conditions, said computed Mooney being the 4 minute Mooney viscosity measured on large rotor of a gel free polymer that takes the same amount of oil to produce a rubber oil fine furnace black compound of the same Mooney viscosity when the furnace black in the compound is one half the weight of the rubber plus oil and the same mixing times are utilized.

2. A rubbery compound adapted for low temperature use comprising a mixture of a hydrocarbon, oil-compatible polymerization product of a conjugated diolefin having not in excess of 8 aliphatic carbon atoms, said product having a computed Mooney of at least 90, and at least 35 parts of an ester of an aliphatic alcohol having more than 2 carbon atoms and an acid residue as left from the distillation at about 100 to 270° C. at about 4 to 20 millimeters of mercury pressure of residual products from steam distillation of primary products of caustic hydrolysis of castor oil.

3. A rubber compound suitable for preparing articles having a flexibility at relatively low temperature comprising (1) a rubbery polymerization product of a conjugated diolefinic compound of less than 8 aliphatic carbon atoms which product is compatible with aliphatic hydrocarbon oils, has a computed Mooney of at least 90 and (2) at least 35 parts of an ester of an acid residue as left from the distillation at about 100 to 270° C. at about 4 to 20 millimeters of mercury pressure of residual products from steam distillation of primary products of caustic hydrolysis of castor oil and an alcohol having at least 2 carbon atoms.

4. A rubber compound suitable for preparing articles having flexibility at relatively low temperature comprising (1) a rubbery polymerization product of a conjugated diolefinic compound of less than 8 aliphatic carbon atoms which product is compatible with aliphatic hydrocarbon oils, and has a computed Mooney of at least 90, (2) at least 20 parts of an ester of an acid residue as left from distillation at about 100 to 270° C. at about 4 to 20 millimeters of mercury pressure of residual products from steam distillation of primary products of caustic hydrolysis of castor oil and an aliphatic alcohol having at least 2 carbon atoms, and (3) at least 10 parts of a hydrocarbon compatible plasticizer.

5. A rubber compound suitable for preparing articles having flexibility at relatively low temperature comprising (1) a rubbery polymerization product of a conjugated diolefinic compound of less than 8 aliphatic carbon atoms which product is compatable with aliphatic hydrocarbon oils, has a computed Mooney of at least 90 and (2) at least 35 parts of 2-ethylbutyl ester of an acid residue as left from the distillation at about 100° C. to 270° C. at about 4 to 20 millimeters of mercury pressure of residual products from steam distillation of primary products of caustic hydrolysis of castor oil.

6. An extruded rubber compound for low temperature use made from (1) a rubbery polymerization product of a conjugated diolefinic compound of less than 8 aliphatic carbon atoms which product is compatible with aliphatic hydrocarbon oils and has a computed Mooney of at least 90 and (2) at least 35 parts of an ester of an alcohol having at least 2 carbon atoms and an acid residue as left from the distillation at about 100° C. to 270° C. at about 4 to 20 millimeters of mercury pressure of residual products from steam distillation of primary products of caustic hydrolysis of castor oil.

7. A molded rubber compound for low temperature use made from (1) a rubbery polymerization product of a conjugated diolefinic compound of less than 8 aliphatic carbon atoms which is compatible with aliphatic hydrocarbon oils and has a computed Mooney of at least 90 and (2) at least 35 parts of an ester of an acid residue as left from distillation at about 100 to 270° C. at about 4 to 20 millimeters of mercury pressure of residual products from steam distillation of primary products of caustic hydrolysis of castor oil and an aliphatic alcohol having at least 2 carbon atoms.

8. A pneumatic tire with a tread portion made from (1) a rubbery polymerization product of a conjugated diolefinic compound of less than 8 aliphatic carbon atoms which is compatible with aliphatic hydrocarbon oils and has a computed Mooney of at least 90 and (2) at least 35 parts of an ester of an acid residue as left from distillation at about 100 to 270° C., at about 4 to 20 millimeters of mercury pressure of residual products from steam distillation of primary products of caustic hydrolysis of castor oil and an aliphatic alcohol having at least 2 carbon atoms.

9. A rubbery compound adapted for low temperature use comprising a mixture of a hydrocarbon, oil-compatible, polymerization product of a conjugated diolefine having not in excess of 8 aliphatic carbon atoms having a computed Mooney of at least 90 and at least 35 parts of an ester of an aliphatic alcohol having more than 2 carbon atoms and a long chain polycarboxylic acid having an average molecular weight of around 1000 and being essentially non-volatile at 270° C. and 4 mm. pressure, said long chain polycarboxylic acid being an acid residue as left from distillation of residual products of steam distillation of primary products of hydrolysis of castor oil.

10. A rubbery compound adapted for low temperature use comprising a mixture of a hydrocarbon, oil-compatible, polymerization product of a conjugated olefine having not in excess of 8 aliphatic carbon atoms having a computed Mooney of at least 90 and at least 35 parts of an ester of an aliphatic alcohol having more than two carbon atoms and a long chain, polycarboxylic acid having an acid number between 140 and 165, an average molecular weight of around 1,000 and containing slightly less than two carboxylic acid groups per molecule, said long chain polycarboxylic acid being an acid residue as left from distillation of residual products of steam distillation of primary products of hydrolysis of castor oil.

References Cited in the file of this patent

UNITED STATES PATENTS 2,569,404    Dazzi  ---------------- Sept. 25, 1951